T. Duval,

Bench Plane.

No. 97,177.                                      Patented Nov. 23, 1869.

Witnesses:
N. C. Wilder,
Jeremy W. Blip

Inventor:
Theodore  his × mark  Duval

United States Patent Office.

THEODORE DUVAL, OF HARTFORD, CONNECTICUT.

Letters Patent No. 97,177, dated November 23, 1869.

---

IMPROVEMENT IN CARPENTERS' GROOVING-PLANE.

---

The Schedule referred to in these Letters Patent and making part of the same.

---

*To all whom it may concern:*

Be it known that I, THEODORE DUVAL, of Hartford, county of Hartford, and State of Connecticut, have invented certain new and useful Improvements in "Dadoes" or Grooving-Tool, (commonly called a "dado,") for forming grooves in wood below the surface; and to enable others skilled in the art to make and use the same, I will proceed to describe it, referring to the drawings, in which the same letters indicate like parts in each of the figures.

The nature of this invention consists in constructing a joiners' or carpenters' grooving-tool, commonly called a "dado," in two parts, so that the two parts may be easily and quickly adjusted relatively to each other, that a groove or grooves may be formed therewith of various widths.

These "dadoes," as usually made by tool-makers, are kept on sale by tool-venders, classified as moulding-tools, are made of various widths, to cut or form grooves of certain widths, each tool for each width.

The object of this invention is to produce in one tool all that is required to form grooves of several different widths, or of any particular width, according to the thickness of a shelf, or other purpose for which said grooves may be required.

In the accompanying drawings—

Figure 2:
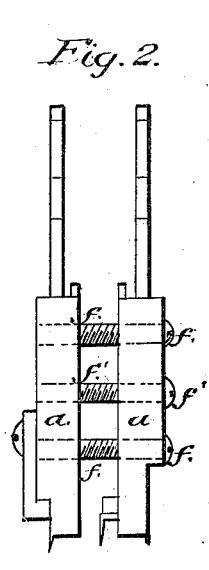
Figure 2 is an end view.
Figure 1:
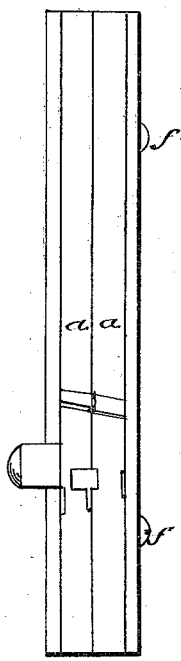
Figure 1 is a face view of a "dado" constructed after this improvement.
Figure 3:
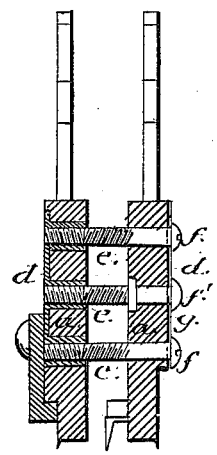
Figure 3 is a cross-section view, showing how the two parts are expanded or contracted to form a groove of any given or desired width.

$a$, the "dado"-stocks, made in two parts, each of which parts is constructed very much in the common way of making "dadoes."

These two parts are held in uniform relative positions with each other, and expanded or contracted to the width it is desirable the tool shall cut, by means of adjusting-screws $f$.

$d$ are metallic plates, fitted into depressions formed in the outsides, near the ends, and flush with the surface of the stock. These plates are firmly secured by screws to the stock.

The plates upon one side of the tool are provided with hubs $e$, through which the screws $f$ are fitted to turn in and out closely and freely.

The screws $f$ pass through the plates $d$ and stock, and are held in a fixed position against an endwise movement by a collar, $g$, recessed into and flush with the inside surface of the stock, thence the screw passes into the hubs $e$.

The screws $f'$ pass through the plates $d$ and stock, into the hubs $e$.

The cutting-irons, gauge, or stops which regulate the depth of the groove to be cut by the tool, the spurs for cutting the width of the groove, are all constructed very much in the common way.

Now, it will be seen that with the use of this "dado" or grooving-tool, I am enabled to adjust the double or two parts so that the grooves may be made therewith of any desirable width, thus accomplishing with one tool what heretofore has required several tools, or, in other words, has heretofore required a tool for each width of groove to be formed.

I believe I have thus shown the nature, construction, and advantage of this invention, so as to enable others skilled in the art to make and use the same therefrom.

What I claim, and desire to secure by Letters Patent, is—

As an article of manufacture, a "dado" or grooving-plane for carpenters' use, when constructed in two parts, and made adjustable in the manner substantially as shown and described, and for the purpose specified.

THEODORE  $\overset{\text{his}}{\times}$  DUVAL. [L. S.]
mark.

Witnesses:
N. C. WILDER,
JEREMY W. BLISS.